(12) United States Patent  
Ballweg

(10) Patent No.: US 8,031,564 B2
(45) Date of Patent: Oct. 4, 2011

(54) METHOD AND CIRCUIT FOR EVALUATING A WOBBLE SIGNAL

(75) Inventor: Christof Ballweg, Villingen (DE)

(73) Assignee: Thomson Licensing (FR)

(*) Notice: Subject to any disclaimer, the term of this patent is extended or adjusted under 35 U.S.C. 154(b) by 1175 days.

(21) Appl. No.: 11/447,559

(22) Filed: Jun. 6, 2006

(65) Prior Publication Data

US 2006/0291343 A1 Dec. 28, 2006

(30) Foreign Application Priority Data

Jun. 28, 2005 (EP) .................................. 05105758

(51) Int. Cl.
*G11B 7/00* (2006.01)
(52) U.S. Cl. ................................ 369/44.13; 369/59.25
(58) Field of Classification Search ............... 369/47.27, 369/124.05, 59.15, 59.27, 44.13, 59.17, 47.35, 369/59.25
See application file for complete search history.

(56) References Cited

U.S. PATENT DOCUMENTS 7,280,450 B2 * 10/2007 Buchler ...................... 369/47.27
7,292,522 B2 * 11/2007 Nagai et al. .................. 369/59.1
2004/0240346 A1 12/2004 Yoshioka

FOREIGN PATENT DOCUMENTS

EP 1 315 154 A2 5/2003
EP 1 388 850 A1 2/2004

OTHER PUBLICATIONS

Search Report Dated Nov. 16, 2005.
Patent Abstracts Pf Japan vol. 2003, No. 12, Dec. 5, 2003 & JP 2003 346343 A (Sony Corp), Dec. 5, 2003 *abstract*.

* cited by examiner

*Primary Examiner* — Will J Klimowicz
*Assistant Examiner* — Kim Chu
(74) *Attorney, Agent, or Firm* — Jack Schwartz & Associates PLLC

(57) ABSTRACT

The invention relates to a method for evaluating a wobble signal. Also described is a circuit for performing such method and an apparatus for reading from and/or writing to optical recording media using such method or circuit. According to the invention the method includes the steps of:
  determining the sign of the wobble signal, the sign indicating whether a wobble period of the wobble signal is inverted or non-inverted,
  generating a filtered signal by a weighted averaging of the sign over two or more wobble periods, the weighted averaging being performed by subtracting a sum of the signs obtained from a second stage of delay lines from a sum of the signs obtained from a first stage delay lines, and
  integrating the filtered signal.

8 Claims, 2 Drawing Sheets

METHOD AND CIRCUIT FOR EVALUATING A WOBBLE SIGNAL

This application claims the benefit, under 35 U.S.C. 119, of German patent application no. 05105758.6 filed 28 Jun. 2005.

FIELD OF THE INVENTION

The invention relates to a method and a circuit for evaluating a wobble signal, and to an apparatus for reading from and/or writing to optical recording media using such method or circuit.

BACKGROUND OF THE INVENTION

Many types of optical recording media use a sinusoidal wobble signal for synchronizing the write pulses during recording. This wobble signal also contains address information for position and address recordings. U.S. Pat. No. 6,765,861 mentions a wobble using a single phase modulation, where a logic "1" is represented by four inverted sines (18° phase shifted sines), a logic "0" is represented by four non-inverted sines (0° phase). A similar modulation scheme is used for example in the SYNC unit of the DVD+RW, where four inverted wobbles are provided for word sync followed by four non-inverted wobbles. See ECMA-337: Data Interchange on 120 mm and 80 mm Optical Disk using +RW Format—Capacity: 4,7 and 1,46 Gbytes per Side. For this medium most wobble periods are non-inverted, only a small number of wobble periods are inverted. In other words, the phase encountered for the majority of wobble periods defines which wobble periods are to be considered as inverted.

To detect a wobble address the phase of the wobble signal has to be detected. This detection is usually accomplished by multiplying the filtered analog wobble signal with a reference signal (sine) from a locked wobble PLL and integrating the result over one wobble period. The integration result is positive for a wobble signal without phase shift and negative for a phase shifted signal. However, under certain circumstances, e.g. in case of noise or a low signal amplitude, a misdetection of the signal phase can occur. This in turn may lead to a misdetection of the address information. To improve the reliability of the wobble detection, it is known from e.g. U.S. Pat. No. 6,765,861 to integrate the analog wobble signal multiplied with the reference signal over more then one wobble period. In this case, however, a state machine has to be locked to the data stream.

SUMMARY OF THE INVENTION

It is an object of the present invention to propose a simplified method for wobble detection with an improved reliability, and a circuit for performing this method.

According to the invention, this object is achieved by a method for evaluating a wobble signal, having the steps of:
  determining the sign of the wobble signal, the sign indicating whether a wobble period of the wobble signal is inverted or non-inverted,
  generating a filtered signal by a weighted averaging of the sign over two or more wobble periods, the weighted averaging being performed by subtracting a sum of the signs obtained from a second stage of delay lines from a sum of the signs obtained from a first stage delay lines, and
  integrating the filtered signal. The invention uses the sign of the wobble signal, i.e. the phase, to suppress errors caused by a wrong phase detection in the retrieved data stream. A "−1" represents a inverted wobble period (phase 180°), a "+1" a non-inverted wobble period (phase 0°). By using the sums of the signs obtained from the stages of delay lines all signs within one stage of delay lines are weighted equal. Advantageously, the wobble signal is a sine signal, where bits are encoded as inverted or non-inverted sines. The weighted averaging is used to generate a more reliable data stream.

A circuit for performing the method according to the invention preferably includes:
  a sign determination block for determining the sign of the wobble signal, the sign indicating whether a wobble period of the wobble signal is inverted or non-inverted,
  a filter for generating a filtered signal by a weighted averaging of the sign over two or more wobble periods, the filter having a first and a second stage of delay lines and a subtractor for subtracting a sum of the signs obtained from the second stage of delay lines from a sum of the signs obtained from the first stage of delay lines and
  an integrator for integrating the filtered signal.

Advantageously, the method further includes the step of multiplying the wobble signal with a reference signal and integrating the resulting signal over one wobble period before determining the sign of the wobble signal. This is preferably done by an integrate and dump filter. Integrating the wobble signal multiplied with a reference signal has the advantage that the reliability of the determination of the sign of the wobble period is increased.

Preferably, the filtered signal is generated over eight wobble periods. For this purpose the first and the second stage of delay lines each have four delay taps. In this approach advantage is taken of the signals constraint of four periods with identical phase used for example in the SYNC unit of DVD+RW. For other types of optical recording media using a different number of inverted wobble periods for representing a bit, the number of averaged wobble periods or the number of delay taps is chosen accordingly.

An apparatus for reading from and/or writing to optical recording media preferably uses a method or a circuit according to the invention for evaluating a wobble signal.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERED EMBODIMENTS

Figure 1:
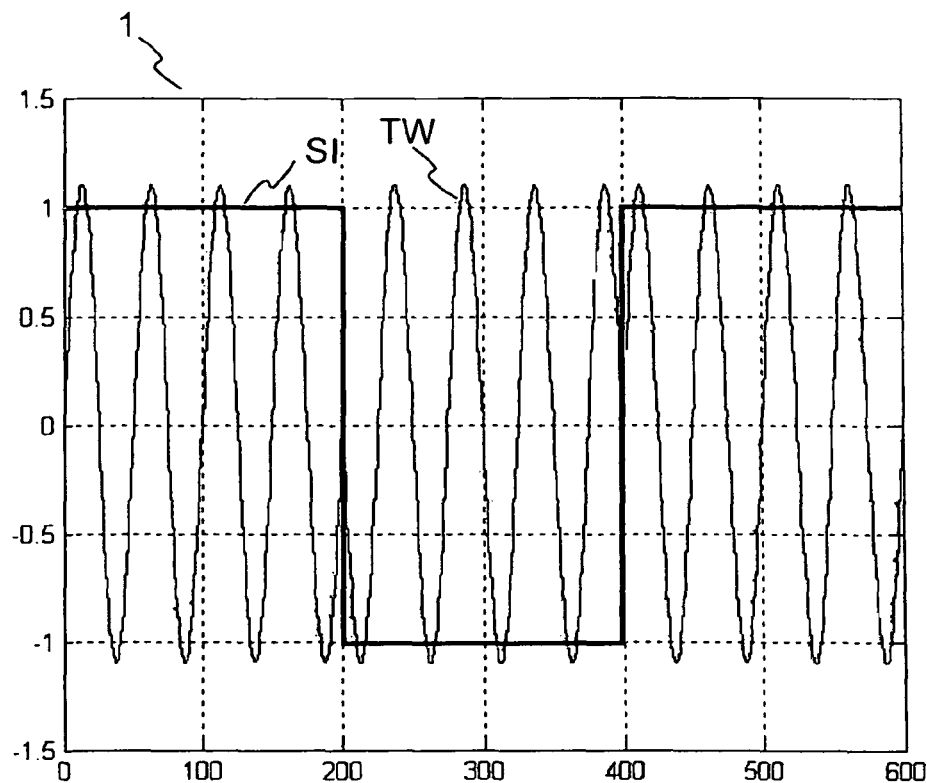
FIG. 1 shows a wobble signal using four inverted wobble periods, as well as the corresponding sign of each wobble period.

The graph 1 in FIG. 1 shows a wobble signal TW using four inverted wobble periods, as well as the corresponding sign SI of each wobble period. The wobble is a sinusoidal signal, where the address information is coded in inverted sine periods. Each bit is coded by four sine periods.

Figure 2:
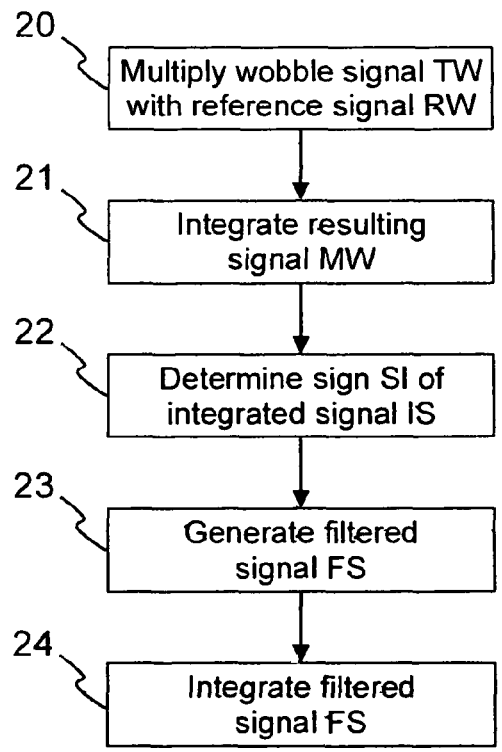
FIG. 2 illustrates a method for wobble evaluation according to the invention.

In FIG. 2 a method for wobble evaluation according to the invention is illustrated. The wobble signal TW is multiplied 20 with a reference signal RW. The resulting signal MW is first integrated 21 over one wobble period, then the sign SI of the integrated signal IS is determined 22. Subsequently a filtered signal FS is generated 23 by a weighted averaging of the sign SI over two or more wobble periods. Finally, the filtered signal FS is integrated 24.

Figure 3:
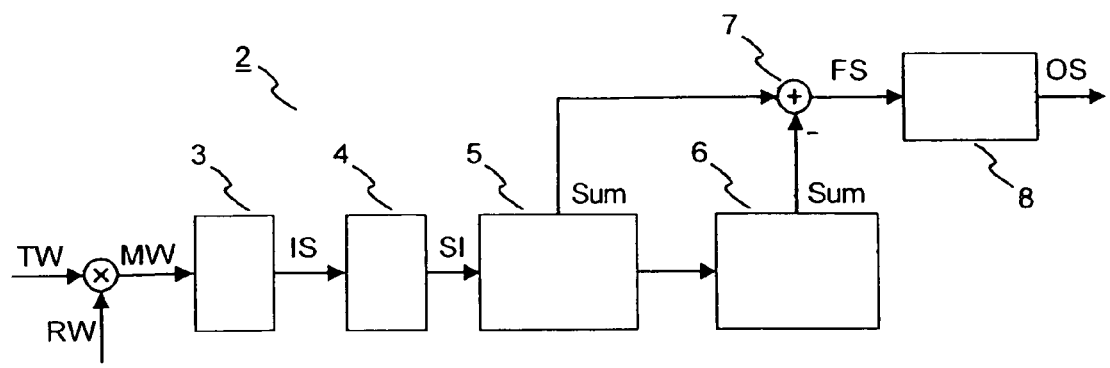
FIG. 3 depicts a block diagram of a circuit used for wobble evaluation.
Figure 4:
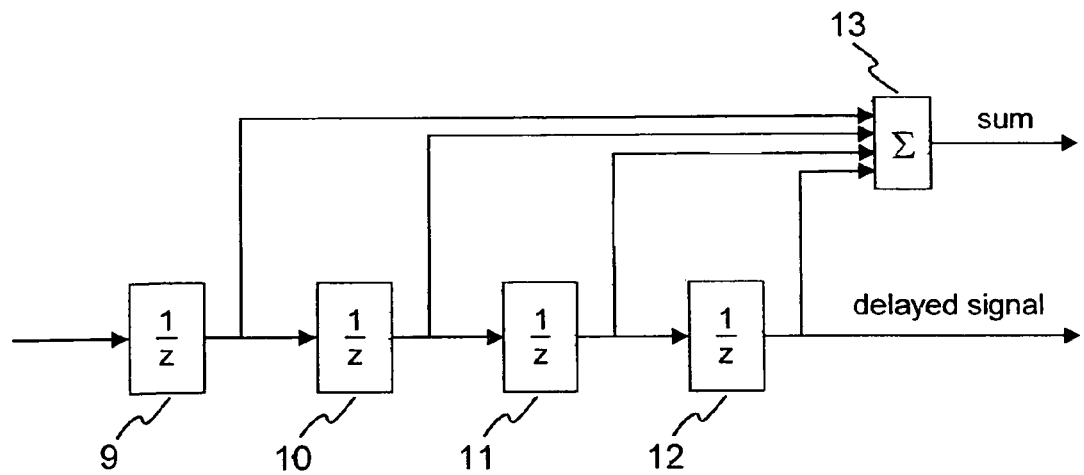
FIG. 4 shows a block diagram of a delay line with sum output used in the circuit.

FIG. 3 shows a block diagram of a circuit 2 employed for wobble evaluation. An integrate and dump filter 3 integrates the signal MW, resulting from the multiplication of the wobble signal TW with the reference signal RW, over one wobble period. A sign determination block 4 determines the sign SI of the integrated signal IS. A subsequent filter uses this sign SI to suppress glitches in the data stream. Filtering is done with two stages 5, 6 of delay lines having a sum output. The sum output by the second stage 6 is subtracted from the sum output by the first stage 5 by a subtractor 7. The resulting filtered signal FS is integrated by an integrator 8. A block diagram of the delay lines 5, 6 with sum output is shown in FIG. 4. The delay lines 5, 6 include four delay elements 9, 10, 11, 12 and a summator 13. All signs within one filter stage 5, 6 are weighted equal. The whole structure is clocked once per wobble period. If the result OS of the integration is above zero, the signal is detected as "+1", if it is below zero the signal is detected as "−1". Due to the integration (summing) of more than one sign per stage 5, 6, errors are suppressed.

In the case of an optical recording medium using a single phase modulation with four inverted wobble periods, a delay line 5, 6 with four delay taps 9, 10, 11, 12 per stage is used, because this number fits best to the wobble data-stream used for this type of optical recording medium, where bits are represented by a succession of four wobble periods. It is also possible to use less delay taps per stage. However, though in this case less delay is caused by the filter, the result is less reliable. For optical recording media using more inverted wobble periods for representing a bit, the number of delay taps of each delay stage is preferably set to this number of wobble periods. This means that twice the number of inverted wobble periods are used for averaging.

The approach is easily adaptable to other problems. If a different signal structure has to be detected, the filter function can be adapted to this structure as long as at least two subsequent wobble periods are inverted for representing a bit.

What is claimed is:

1. Method for determining a phase of a wobble signal, the method having the steps of:
   determining phase values for a plurality of wobble periods of the wobble signal,
   wherein a phase value of a wobble period is determined to have a first value if the wobble signal has a non-inverted shape, and wherein a phase value of a wobble period is determined to have a second value if the wobble signal has an inverted shape,
   summing a first sequence of determined phase values obtained from a first stage of delay lines to obtain a first sum signal,
   summing a second sequence of determined phase values obtained from a second stage of delay lines to obtain a second sum signal,
   subtracting said second sum signal from said first sum signal to obtain a filtered signal,
   integrating the filtered signal to obtain an integrated signal, and
   comparing the integrated signal with a threshold to determine the phase of the wobble signal, wherein the phase of the wobble signal is determined to have a first value if the integrated signal is above the threshold, and wherein the phase of the wobble signal is determined to have a second value if the integrated signal is below the threshold.

2. Method according to claim 1, further having the step of multiplying the wobble signal with a reference signal and integrating the resulting signal over one wobble period before determining the sign of the wobble signal.

3. Method according to claim 1, wherein the first sequence of determined phase values comprises four wobble periods and the second sequence of determined phase values comprises four wobble periods.

4. Method according to claim 1, wherein the wobble signal is a sine signal, where bits are encoded as inverted or non-inverted sines.

5. Circuit for evaluating a wobble signal, having:
   a determination block for determining phase values for a plurality of wobble periods of the wobble signal, wherein a phase value of a wobble period is determined to have a first value if the wobble signal has a non-inverted shape and wherein a phase value of a wobble period is determined to have a second value if the wobble signal has an inverted shape,
   a first summing means for summing a first sequence of determined phase values obtained from a first stage of delay lines to obtain a first sum signal,
   a second summing means for summing a second sequence of determined phase values obtained from a second stage of delay lines to obtain a second sum signal,
   a subtraction means for subtracting said second sum signal from said first sum signal to obtain a filtered signal,
   an integrator for integrating the filtered signal to obtain an integrated signal, and a comparator for comparing the integrated signal with a threshold to determine the phase of the wobble signal, wherein the determination block determines the phase of the wobble signal to have a first value if the integrated signal is above the threshold, and wherein the determination block determines the phase of the wobble signal to have a second value if the integrated signal is below the threshold.

6. Circuit according to claim 5, further having an integrate and dump filter for integrating the wobble signal multiplied with a reference signal over one wobble period before determining the phase value of the wobble signal.

7. Circuit according to claim 5, wherein the first and the second stage of delay lines each have four delay taps.

8. Circuit according to claim 5, wherein the wobble signal is a sine signal, where bits are encoded as inverted or non-inverted sines.

* * * * *